United States Patent [19]
Niehaus

[11] 3,913,394
[45] Oct. 21, 1975

[54] TESTING OF AIRCRAFT EQUIPMENT
[75] Inventor: Horst Niehaus, Bremen, Germany
[73] Assignee: Vereinigte Flugtechnische Werke-Fokker GmbH, Bremen, Germany
[22] Filed: May 9, 1974
[21] Appl. No.: 468,219

[30] Foreign Application Priority Data
May 18, 1973 Germany............................ 2325210

[52] U.S. Cl..................................... 73/118; 73/134
[51] Int. Cl.². ........................................ G01M 15/00
[58] Field of Search.......... 73/118, 133 R, 116, 117, 73/136 R, 136 A, 136 B, 136 C, 136 D, 134

[56] References Cited
UNITED STATES PATENTS

| | | | |
|---|---|---|---|
| 2,766,617 | 10/1956 | Tyler et al. ........................ | 73/136 A |
| 3,180,138 | 4/1965 | Hundley................................ | 73/117 |
| 3,577,777 | 5/1971 | Whelan............................. | 73/133 R |
| 3,633,411 | 1/1972 | Bass..................................... | 73/116 |

OTHER PUBLICATIONS
Judge, A. W., The Testing of High Speed Internal Combustion Engines, 1955, 4th Ed. revised, Chapman & Hall Ltd., London, pp. 203–206.

*Primary Examiner*—Jerry W. Myracle
*Attorney, Agent, or Firm*—Ralf H. Siegemund

[57] ABSTRACT

A test stand is provided with multiple flanges for connection to individual pieces of auxiliary aircraft equipment of the driving or driven variety, outside of the aircraft, preferably right before installation therein. The test stand includes additionally a gear train with shafts for connection to the equipment to be tested as well as to a test drive motor, a blower for cooling air, and a hydraulic pump or compressor. The shaft to the test drive motor is used as pick up for speed and torque during the test. One of the shafts is disconnectible from the train by a clutch and is connected to a fly-wheel and/or brake. Rotary power generating equipment such as a gas turbine, hydraulic motor and/or air turbine are tested by using either the fly wheel and/or brake as a load or by controlling an electric test drive motor as generator.

13 Claims, 2 Drawing Figures

TESTING OF AIRCRAFT EQUIPMENT

BACKGROUND OF THE INVENTION

The present invention relates to testing of auxiliary equipment, such as secondary, power generating machines and other auxiliary equipment in an aircraft, and more particularly the invention relates to ground equipment for testing such on-board power generating machinery and other auxiliary equipment but independently from the aircraft itself.

Within the context of this invention, certain terms should be defined. The secondary and auxiliary power generating machines, or just secondary power equipment for short, includes all machines other than the main thrust producing engine or engines. The secondary power generating machines can be divided in two groups of auxiliary machines, one being of the driving variety, the other one encompassing driven machines. Driving machines include auxiliary gas turbines, air turbines and hydraulic motors. Driven machines include electric generators, hydraulic pumps, fuel pumps and air compressors. Whereby, however, the driven machines are preferably but not necessarily driven by the driving machines, they may be driven by the main engine instead. "Other" auxiliary equipment includes e.g. distribution gear for distributors of (motive) power to the driven machines.

Ground equipment is to refer to equipment which is not part of the aircraft and independent operation of such ground equipment refers to the fact that testing of the secondary machines and auxiliary equipment as defined is to be carried out without using on-board power sources such as the main engine.

Secondary machines and auxiliary equipment are usually tested by the maker of the respective piece of equipment prior to delivery for installation. It is quite customary that different vendors furnish these pieces of equipment to the aircraft manufacturer. The test usually includes function test and power output tests. In addition or in lieu of these tests, the equipment is tested upon installation in an aircraft. Both methods or at least one of them can be regarded as a prerequisite but is deemed insufficient; particularly after regular maintenance and/or repair work additional tests are needed. Moreover, such equipment after having been tested may be kept in stock and is not used right away, i.e. not shortly after a successful test. Moreover, if the manufacturer of the equipment has tested such equipment he usually delivers the tested equipment to the facilities in which the equipment is to be installed in an aircraft. The transport, however, may produce defects which can be discovered only if the equipment is tested again. Moreover, there is always an inherent delay between the last test and installation for a variety of reasons and defects may occur during that period. Cost and delays are incurred when a defect is observed in a piece of equipment after installation and has to be taken out and repaired or even transported to the manufacturer.

Another aspect to be considered is the fact that testing of a, possibly, defective piece of equipment when installed in the aircraft is undesirable for many reasons. Aside from the fact that it is expensive because the main engine or even engines must run, such procedure is also time consuming because mounting of relatively large pieces of equipment inside of an aircraft is difficult due to lack of space.

DESCRIPTION OF THE INVENTION

It is an object of the present invention to test aircraft auxiliary equipment as defined above, on the ground, outside of the aircraft, without using the aircraft's engine for delivery of power needed for the test. The test equipment must be capable of permitting test runs for both, driving auxiliary and secondary machines as well as other auxiliary equipment.

It is another object of the present invention to provide for testing of secondary power generating machines as they are used in an aircraft as well as other on-board auxiliary equipment and including machines and equipment which are used for generating rotational power as well as those which use rotational power and generate electric pneumatic and/or hydraulic energy.

It is a specific object of the invention to provide for test facilities which can be used conveniently e.g. right before a piece of such auxiliary equipment is installed in an aircraft, so that it can be tested outside of the aircraft and without using any of the on-board equipment.

In accordance with the preferred embodiment of the invention it is suggested to use a base or frame with a drive motor and a gear train with multiple shafts in a casing being mounted on the frame. The motor is connected to one of the shafts via a shaft for pick up of torque, and speed. The casing has a plurality of connecting flanges traversed by couplings or the like for the several shafts on the gear train, so that individual pieces of equipment can be bolted to the flange and connected to the shaft.

The test equipment includes additionally a compressor and a hydraulic pump to provide for the necessary pressurized fluid if an air turbine and a hydraulic motor are to be tested. The test equipment is augmented by individual dummy loads for those pieces of equipment to be tested which are to be driven by the test drive motor. These dummy loads, known per se, simulate electric, pneumatic and hydraulic load and provide for energy and power dissipation.

With regard to the test of machines of the driving variety one has one of two options, but both can and should be provided for. Load simulation for such a machine may be established by a fly wheel and/or brake in which case the particular shaft for that fly wheel and/or brake and for a driving piece of equipment to be tested should be disconnectible from the gear train and particularly from the test drive motor, particularly if the test drive motor is needed to run an oil pump or a compressor to feed the respective fluid to an hydraulic motor or an air turbine when tested.

The second option uses the test drive motor as controllable, variable load, particularly when the starter turbine is to be tested. The test drive motor, a speed controlled motor in that case, may be controlled to operate as generator at first switching over into a rotation-assist, motor mode in simulation of a successful start up of the engine.

When a piece of equipment of the driving machine variety is to be tested and if that machine requires e.g. pressurized fluid, the test motor must for that purpose drive the fluid device of the test equipment, and the motor may still serve as load for the machine to be tested, but control becomes rather complicated. It is simpler for these cases to use a fly wheel and/or brake as a load.

It can readily be seen, that the equipment in accordance with the invention permits readily testing of auxiliary equipment of an aircraft on the outside, possibly right before installation. The same test equipment can be used while the severl pieces of machinery are installed one by one and just tested on the outside right before being mounted inside of the aircraft.

The main engine or engines do not participate in that test so that unnecessary starts and runs thereof are avoided. The usefull life of the engines is, therefor, extended. The test drive motor needs to be rated only for running the tests so that energy is saved in the test procedure. Moreover, the tests can be carried out e.g. at an air field which is particularly of interest if maintenance and even repairs are carried out by airline personal or by a governmental agency which is the case e.g. for military aircraft.

It may be advisable to mount the test equipment on a vehicle so that the pieces of equipment after having been tested can be hoisted right into the aircraft to minimize transport of that equipment following the test.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates a base 1, and a principal drive motor 2 as well as a distributor gear 6 are secured to the base. These are the basic components of the test equipment. The frame or base 1 may be platform of a vehicle, self-propelled or driven by a suitable truck or the like to be placed into the vicinity of an aircraft that is being built.

Figure 1:
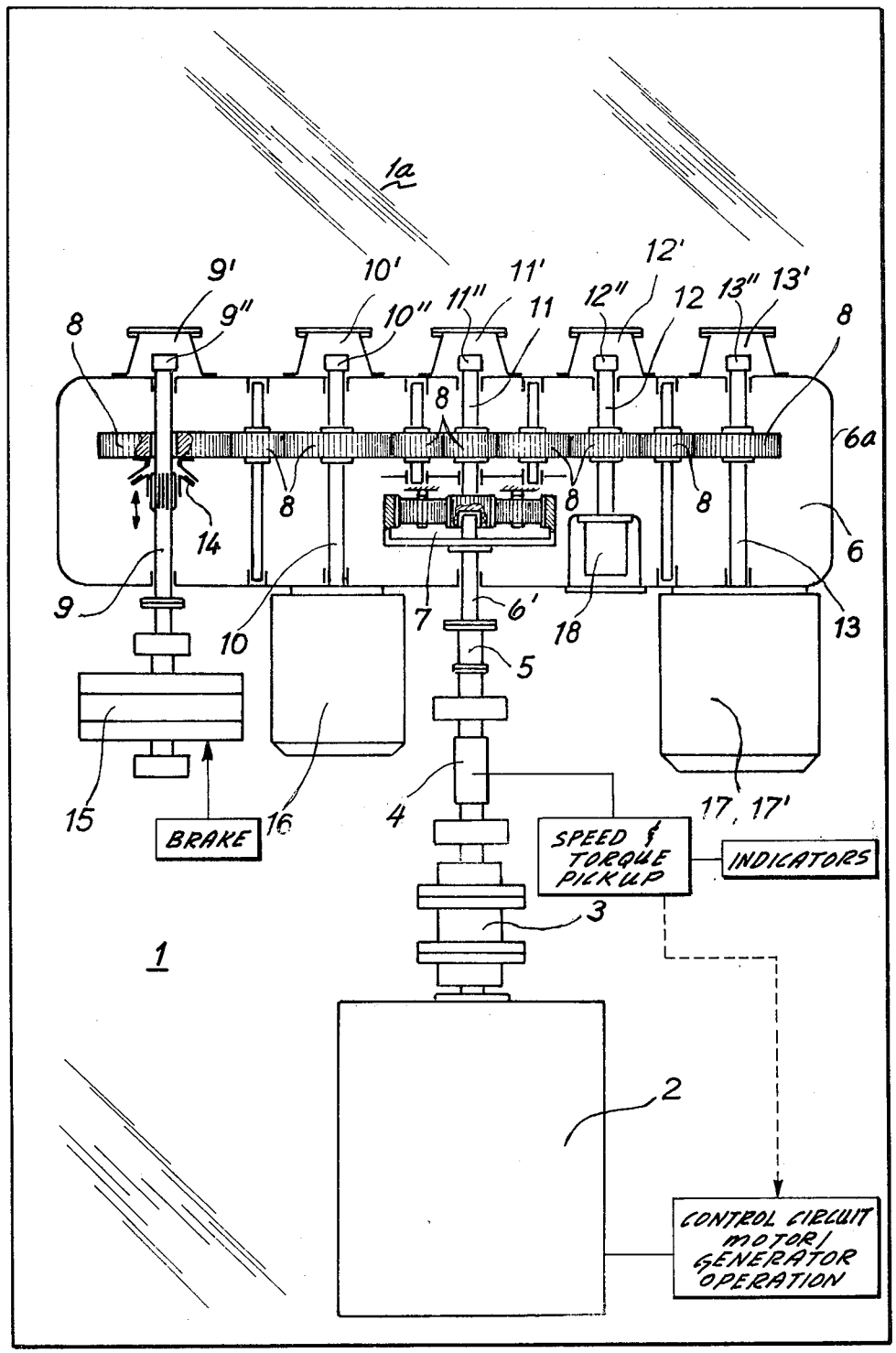
FIG. 1 is a top elevation, partially in section view, of the test equipment as mounted on a base.

The output shaft of motor 2 is connected to a shear coupling 3 whose driving side connects to a torque and speed output pick up shaft. Which in turn is connected to a flexible shaft 5, and the input shaft 6' of the distributor gear 6. Shaft 4 is specifically designed for measuring speed and torque. The shaft may, for example be equipped with strain gauges calibrated to indicate transmitted torque. Additionally rotational speed may be measured on the shaft so that the transmitted power can be ascertained in each instant.

Motor 2 could be an internal combustion engine, but it is preferred to employ an electric motor whose speed can be controlled. Moreover, for reasons, below the motor should be capable of operating as generator so that the direction of torque transmission can be reversed.

In the case of driving gear 6 from motor 2 torque is transmitted by shaft 6' to a planetary gear 7 for modifying the speed of rotation. A shaft 11 constitutes the output of gear 7 and carries one of the pinions 8, which in the plurality establish a gear train for distribution of rotation to several, parallelly oriented shafts such as shafts 9, 10, 12, and 13.

The shafts 9 through 13 are all journalled in the casing 6a of distributor gear 6, and each shaft has a connecting flanges respectively denoted 9', 10', 11', 12', 13' and including in particular shaft couplings or shaft connection flanges 9", 10" etc. Equipment to be tested will be connected with its respective shaft, driving or driven as the case may be, to the respective coupling, while the equipment itself is e.g. bolted to casing 6a. The flanges all extend from one side of casing 6a, in front of an area 1a on base 1 on which the pieces of equipment are placed when tested.

The test equipment has, in addition certain pieces of equipment needed for conducting the tests. Shaft 10, for example, is connected (in addition to flange 10') to a blower or fan 16, for example for delivering cooling air. Shaft 13 is connected either to a compressor 17 for providing compressed air to an air turbine to be tested. Alternatively a hydraulic pump 17' can be connected to shaft 13 to provide pressurized hydraulic fluid for a hydraulic motor when tested.

Therefor it is advisable to provide shaft 13 and casing 6a with the necessary connections to permit either a compressor or a hydraulic pump to be connected thereto, while the respective other machine is stored or held on a rack on base 1 on a stand by basis. A reservoir for hydraulic liquid may also be provided on base 1.

These machines, 17 and 17', are needed to provide operating fluid at the desired degree of pressurization whenever a piece of equipment or machine of the driving variety is to be tested and needs such fluid for operation, compressed air in the case of an air turbine, hydraulic oil in the case of a hydraulic motor. None of these machines 17, 17' should be connected to the gear train when a piece of equipment of the driven variety is tested to avoid unnecessary load conditions on the test drive motor. However, if one or the other of these machines 17 can be operated as a fixed i.e. constant load, the resulting differentials in pick up values as derived from shaft 4 may suffice as test values.

A pump 18 is contained in casing 6a for the gear 8 and is driven by shaft 12. This pump provides for adequate lubrication for bearings and gears in the system. This pump runs continuously and is clearly a known load on the gear and transmission.

One of the gears or pinions of the distributor system 8 is denoted by 8', and a coupling 14 provides for selective connection of shaft 9 to the gear 8'. The gears of the train all rotate in unison, but shaft 9 can be connected to or disconnected from the gear train. The one end of shaft 9 which is located opposite to flange 9', is connected to a fly wheel 15 of variable mass; a brake may be installed here also to vary the load on the wheel.

It is convenient to have the fly wheel and/or brake permanently coupled to shaft 9 and to have clutch 14 in the disconnect state whenever the fly wheel is not needed or desired as a load simulator. The fly wheel should be constructed to add and to subtract mass for purposes of simulating different load conditions. A brake may be provided to act on the fly wheel.

Figure 2:
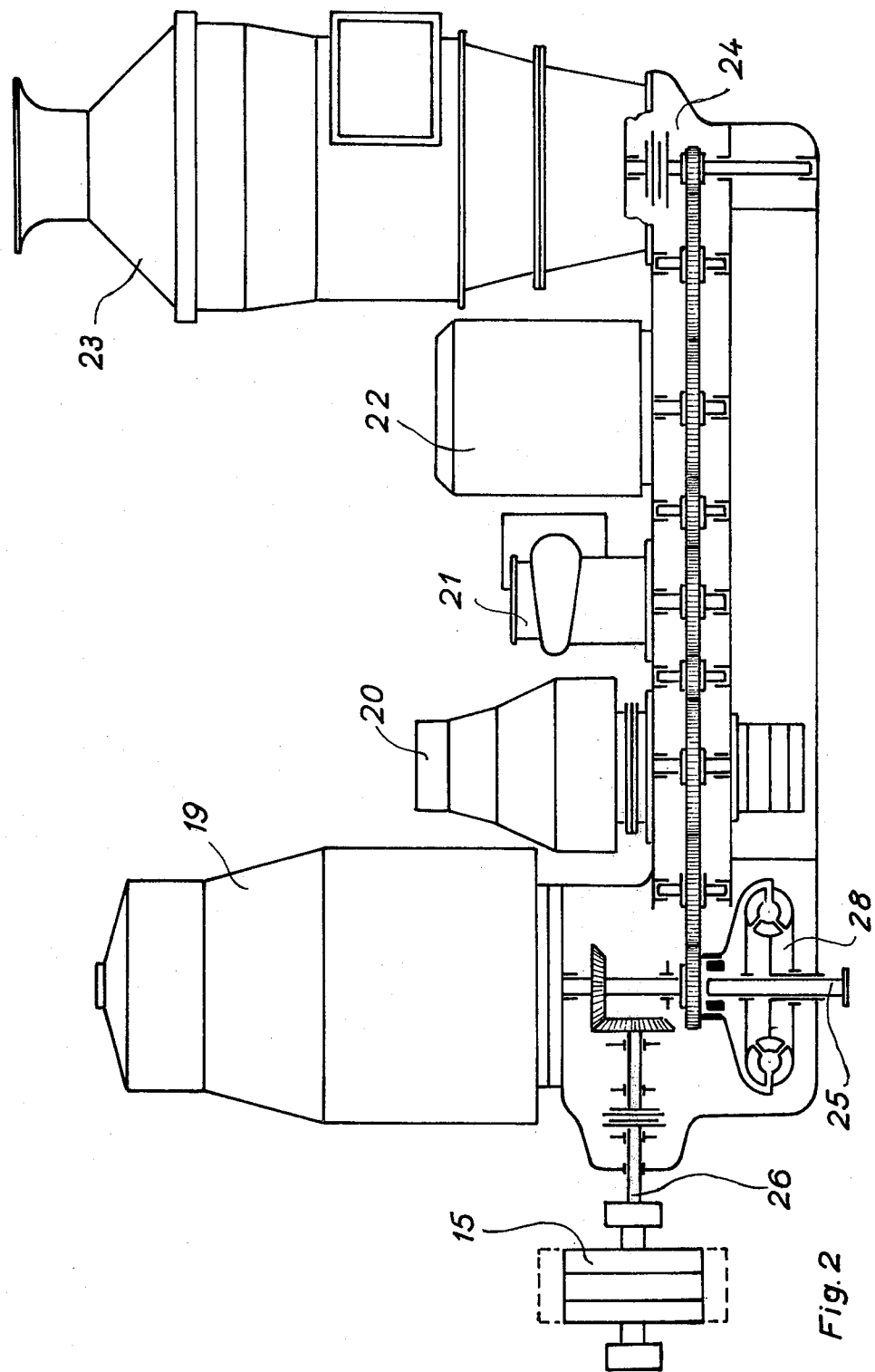
FIG. 2 is a top elevation of aircraft equipment to be tested.

FIG. 2 shows secondary power generating equipment as used in an aircraft and as installed therein. All the pieces of equipments are flanged to the casing of a distributor gear 24 and the respective shafts are bolted to the distributor shafts or otherwise releasably coupled thereto. The equipment includes an electric generator 19 for generating the electricity needed on board; a hydraulic pump 20 furnishing pressurized oil, a fuel pump 21 for an engine; a compressor 22 e.g. for the air conditioning and an auxiliary gas turbine 23. The components 19 to 22 are secondary power generating machines of the driven variety, whereas 23 is a piece of power generating equipment which drives these pieces of equipment 19 to 22.

While the driven equipment is used in all air crafts the auxiliary drives may differ. Thus, the air craft may not have an auxiliary gas turbine but an air turbine or a hydraulic motor. Conceivably an aircraft may have several sets of such auxiliary drive equipment e.g. for reasons of redundance, and their respective prime mover may be different. This includes the possibility that the transmission gear 24 with its various driven power generators is driven through alternative inputs. One input, shaft 26 can be loaded by a fly wheel and/or brake 15'. A second input shaft 25 may be connected to a main engine to drive the gear 24 via a torque converter 28.

Proceeding now to the description of function and operation of the inventive test equipment, the several pieces of equipment 19 to 24 of FIG. 2 can be tested individually or together by means of the test equipment shown in FIG. 1. For individual testing of the pieces of equipment they are individually disconnected from gear 24 and flanged to an appropriate flange on the test equipment and connected to the suitable shaft thereof.

Take for example electric generator 19 which when to be tested individually, will be flanged to flange 11' and its shaft will be connected to shaft 11. No other equipment may be connected to the test stand and motor 2 runs and is controlled to provide rated power to the generator. The speed and torque furnished by motor 2 is measured through pick up shaft 4. Clutch 14 disconnects shaft 9 from the gear train to avoid participation of fly wheel 15 as an unnecessary load. Also, fluid pressurizers 17, 17' should be disconnected from shaft 13.

The electrical power generated at that point is measured by connecting an electrical load to the output terminals of generator 19. Such a load may consist merely of ohmic resistances which are being cooled by the stream of cooling air furnished by blower 16 at that point. The test may be run under conditions of controlling motor 2 for constant speed while load changes on generator 19 are simulated possibly in accordance with a particular test program.

Testing of the hydraulic pump 20, of the fuel pump 21 and of the air compressor is carried out analogously. These pieces of equipment are individually connected to the appropriate flanges and their respective shafts are connected to the corresponding shafts of the test stand. Dummy loads are appropriately provided of the type commonly used for that purpose while torque and speed is measured on pick up shaft 4. Pressurized fluid as furnished by the equipment being tested is usually decompressed in such a dummy load with conversion of pressure into heat which in turn is removed through a cooling system.

Testing of the auxiliary gas turbine 23 proceeds differently, because the test requires here the determination whether or not the turbine furnishes rated rotational power. The turbine is bolted to flange 9' for that purpose and its drive shaft is coupled to shaft 9. The fly wheel and/or brake 15 is connected to that shaft and the fly wheel and/or brake is adjusted so that it represents total load usually driven by the gas turbine under consideration that the turbine drives the several pieces of equipment via gearing 24. It must be considered further that the turbine 23 functions as starter so that a main engine is also a load. Still other auxiliary equipment may also be driven by the gas turbine when in operation. All these loads must be considered upon selecting the load for the fly wheel 15 and/or brake for the test case. As stated above, a brake of conventional construction may act on the fly wheel.

During testing the gas turbine clutch 14 disconnects shaft 9 from the driving train, unless the brake needs cooling air and operation of blower 16 is needed. However three cases have to be distinguished here. If additional energy is needed during the test of a piece of equipment of the driving variety e.g. a gas turbine, the tested piece may furnish that energy or motor 2 provides motive power for that purpose. If the energy and power needed is taken from the test piece, i.e. the gas turbine, clutch 14 provides for connection to the gear train 8. Another clutch 3 may disconnect the system from motor 2. This mode of operation may be economical but complicates matters in that the tapped energy and power must be considered in the determination of the load under which the test is run. If, in accordance with the second case to be considered motor 2 is permanently connected to the transmission gear 6, motor 2 will run idly along in this case but must be considered additionally as a load.

More practical is the third alternative case, wherein the test proceeds with disconnected clutch 14 and motor 2 provides just enough power for running the additional equipment needed for the test e.g. the blower 16 for cooling the brake of fly wheel 15.

For testing the gas turbine on its capability to start the engine, the gas turbine is caused to set fly wheel 15, appropriately adjusted, into motion. However, a more realistic test situation can be provided for by using motor 2 as a controllable load. Clutch 14 will be engaged, and the distributor gear and motor 2 are accelerated by the gas turbine. This procedure is particularly advantageous because motor 2 can be controlled as a variable load, using also pick up shaft 4 for tracking the test operation.

Motor 2 may actually be operated as a generator with an electrical circuit connected thereto for load simulation. That load is changed and, in simulation of a successful start, the mode of operation of motor 2 can be changed to motor operation and to assist the drive input from the auxiliary engine at that point, corresponding to pre-start and post-start simulation of the main engine so as to test the starting process with full simulation of the load changes as resulting from a successfull engine start.

As stated above, other kinds of secondary power generators of the driving variety are used in aircraft such as air turbines and hydraulic motors. These motive power generators are connected to flange 9' for testing in analogous manner. However, these motors need additional power in that the air turbine needs compressed air, and the hydraulic motion needs pressurized hydraulic fluid. This then is the purpose of either the compressor 17 or of hydraulic pump 17'.

The testing of these motors requires participation of motor 2 in that the motor drives compressor 17 or pump 17' as the case may be to furnish pneumatic or hydraulic energy to the respective motor bolted to flange 9'. The clutch 14 is disengaged as motor 2 operates the auxiliary equipment for the test case, and the load is established by the fly wheel and/or brake.

The fly wheel does not have to be subjected to braking, but counter rotational force and torque by motor 2 can be used also here, electrodynamic brake, so that power is not mechanically dissipated by braking but electrically, the motor 2 actually running as generator with an electrical load as load simulation or just working against the mains.

Since, however, motive power is needed to drive either the air compressor when an air turbine is tested, or the hydraulic pump when a hydraulic motor is tested, load simulation becomes more complicated but is, nevertheless, preferred) for reasons of still more versatile simulation of operating conditions.

The distribution gear 24 has to be tested also. For this, either shaft 25 or 26 (or one after the other) is connected to shaft 11 and the casing of distribution gear 24 is held in a suitable frame on base 1. The respective other shaft, 26 or 25 will be connected to the fly wheel 15, with brake. The other shafts of gear 24 may connect to standard load units or other mechanical and/or hydraulic loads.

During the test motor 2 drives shaft 11 via the planetary gear 7, and shaft 11, as stated, is drivingly connected to shaft 25 or 26 to test the distribution gearing 24, and the latter imparts power upon the load equipment connected thereto.

The load may be simply the appropriately adjusted fly wheel and/or brake. Alternatively, either hydraulic pump 17' or compressor 17 may act as load simulators with dummy loads connected thereto, just as in case of testing a hydraulic pump or compressor of the aircraft.

The test as outlined above operated with the several pieces of equipment individually. However, the test equipment permits concurrent testing of several pieces by appropriate connection to flanges 9' to 13' and shafts 9 to 13 using also load conditions as outlined above. Such concurrent tests may well be important to determine how simulated load changes on one piece effects the others.

The description above indicates that the inventive equipment permits testing of secondary power equipment and other auxliary equipment in an economical manner and is technically advantageous as well as well organized. One can readily see that the neat grouping of components on test stand 1 (which maybe by a carriage or vehicle) and utilization of a common test drive with different motive power outputs facilitates test procedure. Particularly, connection and disconnection of pieces of equipment to be tested is a fast procedure.

Another important aspect results from the fact that one does not need the aircraft engine to conduct the test which is not only economical, but the life of the main engines in terms of starts and running periods is not shortened by tests. The test with mounting and dismounting of the respective piece to be tested is simplified and quite fast. The tests are conducted on ground and do not require participation of on-board equipment.

The invention is not limited to the embodiments described above but all changes and modifications thereof not constituting departures from the spirit and scope of the invention are intended to be included.

I claim:

1. Equipment for testing secondary power generation machines and other auxiliary equipment, comprising:
 a base; an electric drive motor mounted on the base;
 circuit means connected to run the motor at a controlled speed or as electric power producing load, the circuit means being further constructed to simulate starting of an aircraft engine, operating the motor as drive load with change over to motive power assist motor operation;
 a distribution gear having a plurality of shafts interconnected for rotation by a gear train;
 means including a pick up shaft connecting one of the shafts of the plurality to the motor and provided for measuring speed and torque; and
 a casing for the distribution gear having a plurality of flanges for connection to individual machines and equipment to be tested and to be drivingly connected individually to the said shafts.

2. Equipment as in claim 1, including at least one clutch, one of the shafts of the plurality being connected to the gear train by the clutch.

3. Equipment as in claim 2, said one shaft being connected to a fly wheel.

4. Equipment as in claim 3, said fly wheel having adjustable mass.

5. Equipment as in claim 3, another one of the shafts of the plurality being connected to a blower to provide cooling air during a test.

6. Equipment as in claim 2, said one shaft being connected to a brake.

7. Equipment for testing secondary power generating machines ands other auxiliary equipment of an aircraft, but to be tested outside of the aircraft, comprising:
 a casing having a plurality of connector flanges placed side by side;
 a base supporting the casing and having a mounting area in front of the flanges for mounting pieces of equipment to be tested for connection to the testing;
 a plurality of parallelly operating shafts in the casing terminating in the flanges;
 a gear train in the casing and drivingly interconnecting the shafts of the plurality;
 a drive motor on the base and drivingly connected to the gear train;
 means measuring the torque and speed of the drive motor where connected to the train; and
 means on the base connected to the train and being driven therefrom for furnishing pressurized fluid for conduction of tests.

8. Equipment as in claim 7, wherein the last mentioned means is a compressor to be connected to an air turbine when connected for testing.

9. Equipment as in claim 7, wherein the last mentioned means is a pump for hydraulic fluid to be connected to a hydraulic motor when connected for testing.

10. Equipment as in claim 7, wherein the fluid device is a blower for providing cooling air.

11. Equipment as in claim 7, including a clutch for selectively connecting one of the shafts to the gear train; and a fly wheel and/or brake connected to said one shaft on the other side of the mounting area.

12. Equipment as in claim 7, wherein the last means is a compressor disposed on the base and on the other side of the mounting area.

13. Equipment as in claim 7, wherein the last means is a hydraulic pump.

* * * * *